United States Patent
Lee et al.

(10) Patent No.: US 8,396,341 B2
(45) Date of Patent: Mar. 12, 2013

(54) OPTICAL FILTERS BASED ON POLYMER ASYMMETRIC BRAGG COUPLERS AND ITS METHOD OF FABRICATION

(75) Inventors: Kun-Yi Lee, Taipei (TW); Wei-Ching Chuang, Taipei (TW); Cheng-Che Lee, Taipei (TW); Wei-Yu Lee, Taipei (TW)

(73) Assignee: China University of Science and Technology, Taipei (TW)

( * ) Notice: Subject to any disclaimer, the term of this patent is extended or adjusted under 35 U.S.C. 154(b) by 521 days.

(21) Appl. No.: 12/609,025

(22) Filed: Oct. 30, 2009

(65) Prior Publication Data
US 2011/0103762 A1    May 5, 2011

(51) Int. Cl.
*G02B 6/00* (2006.01)
(52) U.S. Cl. ............ 385/141; 385/31; 385/37; 385/123; 385/129; 385/130
(58) Field of Classification Search ............ 349/15, 349/31, 123, 129, 130, 141, 144, 145; 385/15, 385/31, 123, 129, 130, 141, 144, 145
See application file for complete search history.

(56) References Cited

U.S. PATENT DOCUMENTS
7,853,102 B2 * 12/2010 Lee et al. ............ 385/37
2010/0084261 A1 * 4/2010 Lee et al. ............ 204/192.26

OTHER PUBLICATIONS

Wei-Ching Chuang et al.;Using a micro-molding process to fabricate polymeric wavelength filters;Journal; Aug. 15, 2008;pp. 3985-3989;vol. 281;Optics Communications;Elsevier.

* cited by examiner

*Primary Examiner* — Jennifer Doan
(74) *Attorney, Agent, or Firm* — WPAT, P.C.; Anthony King

(57) ABSTRACT

The present invention discloses a method for fabricating an optical filter based on polymer asymmetric bragg couplers using holographic interference techniques, soft lithography, and micro molding, which comprises following steps: prepare a UV polymer with gratings; coating photo-resister film on the UV polymer, and exposed by UV light to obtain a photo-resister mold with two grooves each having gratings; coating diluted PDMS film on the photo-resister mold, and baking the PDMS film to obtain a PDMS mold having two waveguides with gratings; placing glass substrate over the PDMS mold to form a first tunnel; injecting a precure UV polymer into the first tunnel to from a cladding layer with two grooves having gratings pattern at its bottom; placing glass slide over the cladding layer and injecting a mixed UV polymer into the grooves to form waveguide cores; placing a second glass substrate over the cladding layer, and injecting UV polymer to form an upper cladding layer laminated with the cladding layer to obtain the optical filter based on polymer asymmetric bragg couplers.

4 Claims, 9 Drawing Sheets

OPTICAL FILTERS BASED ON POLYMER ASYMMETRIC BRAGG COUPLERS AND ITS METHOD OF FABRICATION

FIELD OF THE INVENTION

The present invention relates to a method for fabricating optical filter based on polymer asymmetric bragg couplers, especially to a technique that combines the holographic interferometry, soft lithography and micro-molding processes to rapidly produce submicron range gratings on the waveguides of the optical filter based on polymer asymmetric bragg couplers.

BACKGROUND OF THE INVENTION

Wavelength division multiplexing (WDM) has proven to be a key technology for accommodating large bandwidths for the global spread of multimedia communications in optical fiber networks. In WDM-based networks, optical add/drop multiplexer (OADM) devices used to insert (add) or extract (drop) a specific wavelength in optical fiber communication systems are essential. These components allow the extraction of a wavelength from a transmission loop and the addition of the same wavelength to the network (Reference: T. Erdogan, "Optical add-drop multiplexer based on an asymmetric bragg coupler", Optics Communication 157, 249-264 (1998)). Numerous different architectures of add/drop filters based on optical waveguides have been demonstrated. These include Mach-Zehnder interferometer (MZI) based add/drop filters (Reference: D. Gauden, E. Goyat, C. Vaudry, P. Yvernault, and P. Pureur, "Tunable Mach-Zehnder-based add-drop multiplexer", Electro. Letter 40, 1374-1375 (2004)), grating-assisted co-directional couplers (Reference: M. Kalishov, V. Gralsky, J. Schwartz, X. Daxhelet, and D. V. Plant, "Tunable waveguide transmission gratings based on active gain control", IEEE Journal of Quantum Electro. 40, 1715-1724 (2004)), asymmetric Bragg coupler (ABC) based filters (Reference: T. Erdogan, "Optical add-drop multiplexer based on an asymmetric bragg coupler", Optics Communication 157, 249-264 (1998)), and Bragg reflector channel waveguide filters (Reference: M. Dainese, M. Swillo, L. Wosinslki, and L. Thylen, "Directional coupler wavelength selective filter based on dispersive bragg reflection waveguide", Optics Communication 260, 514-521 (2006)). MZI-based add/drop filters yield excellent insertion loss and channel isolation, and they can be built on both all-fiber and integrated-optics platforms. However, their performance is extremely sensitive to the balance of the interferometer and relative placement of the two gratings; therefore, some post-fabrication trimming is often necessary. A grating-assisted co-directional coupler, consisting of two dissimilar waveguides and a long period grating, has been widely discussed for use as a wavelength filter. It has the advantage of a long grating period (about a few tens of micrometers), facilitates the fabrication by using standard photolithography, and has a low back-reflection characteristic, avoiding unwanted optical resonances. The main drawback of such a device is that when it operates in a small spectral bandwidth, a long interaction grating length (about a few hundreds of grating periods) is required. Therefore, it is not beneficial for device integration. Bragg reflector channel waveguide filters have excellent return loss and crosstalk characteristics and are inherently very stable. However, the need for non-reciprocal optical circulators limits its application in integrated optical formats. ABC-based filters, which operate in a contra-directional mode, are not sensitive to grating placement for obtaining a desired filter spectrum. Therefore, they have better stability and reproducible mass production than MZI-based filters.

Polymeric materials offer a conceivable platform to fabricate complex yet affordable integrated optical devices, especially dense wavelength division multiplexers, on a planar substrate; this is due to the benefits of low production cost, easy processing, and mechanical flexibility. Polymer surface-relief Bragg grating, which provides a narrow bandwidth, low crosstalk, and flat-top pass band, has become an essential component for various applications in optical communications and optical sensing. For example, Butler et al used polymer surface-relief Bragg grating on an integrated optical waveguide structure to fabricate a chemical sensor (Reference: T. M. Bulter, E. Igata, S. J. Sheard, and N. Blackie, "Integrated optical Bragg-grating-based chemical sensor on a curved input edge waveguide structure," Opt. Lett., 24, 525-527 (1999)). Noh et al demonstrated a cost-effective tunable wavelength laser based on the thermo-optic tuning of a polymer waveguide Bragg reflector for WDM optical communications (Reference: Y. O. Noh, H. J. Lee, J. J. Ju, M. S. Kim, S. H. Oh, and M. C. Oh, "Continuously tunable compact lasers based on thermo-optic polymer waveguides with Bragg gratings," Opt. Express 16, 18194-18201 (2008)). Other applications of tunable lasers and filters were demonstrated in the references: G J., J. H. Lee, M. Y. Park, C. Y. Kim, S. H. Cho, W. Lee, and B. W. Kim, "Over 26-nm Wavelength Tunable External Cavity Laser Based on Polymer Waveguide Platforms for WDM Access Networks," IEEE Photonics Technol. Lett. 18, 2102-2104 (2006); J. H. Lee, M. Y. Park, C. Y. Kim, S. H. Cho, W. Lee, G J., and B. W. Kim, "Tunable External Cavity Laser Based on Polymer Waveguide Platform for WDM Access Network," IEEE Photonics Technol. Lett. 17, 1956-1958 (2005); M. C. Oh, H. J. Lee, M. H. Lee, J. H. Ahn, S. G Han, and H. G. Kim, "Tunable wavelength filters with Bragg gratings in polymer waveguides," Applied Physics letters 73, 2543-2545 (1998).

The inventors of the present invention recently demonstrated a process to rapidly produce submicron range gratings on waveguide for optical filters using soft lithography, micro-molding, and holographic interference techniques. In this method, the grating structure on a polymer is first fabricated using holographic interferometry and the micro-molding processes. Polymeric wavelength filters are produced by a two-step molding process where the master mold is first formed on a negative tone photo-resist and subsequently transferred to a PDMS mold; following this step, the PDMS silicon rubber mold is used as a stamp to transfer the pattern of the polymeric wavelength filters onto a UV cure epoxy. A high aspect ratio and vertical waveguide sidewalls are obtained by this method, and consistent reproduction of the grating on a UV polymer has been achieved with this process (Reference: W. C. Chuang, C. T. Ho and W. C. Wang, "Fabrication of a high resolution periodical structure using a replication process" Opt. Express 13, 6685-6692 (2005); W. C. Chuang, C. K. Chao and C. T. Ho, "Fabrication of a high resolution periodical structure on polymer waveguide using a replication process" Opt. Express 15, 8649-8659 (2007)). In the present invention, we describe a technique that combines the holographic interferometry, soft lithography, and a simple replication processes for fabricating a polymeric ABC.

Polymeric ABC filters were constructed using the planar channel waveguide configuration. A pair of parallel channel waveguides with different widths was embedded into a planar substrate (Referring to FIGS. 3(a) and 3(b)). The two waveguides are asynchronous because the effective refractive indices of the two waveguides are quite different. In spite of the large index mismatch between the two waveguides, an efficient power coupling was achieved using the Bragg grating engraved on the bottom of the two waveguides. The maximum cross-reflection power coupling occurred at a specific wavelength $\lambda_{d1}$ (Bragg wavelength) satisfying the Bragg reflection condition, $(n_{eff1}+n_{eff2})\Lambda=\lambda_{d1}$, where $n_{eff1}$ and $n_{eff2}$ are the effective indices of the two waveguide modes and $\Lambda$ is the grating period. It implies that the center wavelength of the ABC filter is proportional to the sum of the effective indices of the two individual waveguides. Therefore, when the effective index of any individual waveguide was changed it results in a shift in the center wavelength. Furthermore, an unwanted reflection wavelength, denoted by self-reflection Bragg wavelength ($\lambda_{d2}$), caused by the grating of input waveguide is occurred in the input end. The self-reflection light results in broadening the transmission spectrum of the filters if its spectrum overlaps with the spectrum of cross-reflection light. Such unwanted reflection light can be eliminated by suppressing the grating depth of the input waveguide. Another method is to make the two decoupled waveguides quite dissimilar to avoid the spectrum overlapping.

SUMMARY OF THE INVENTION

It is therefore a primary object of the present invention to develop a process to fabricate dual-channel polymeric waveguide filters based on an asymmetric Bragg coupler (ABC) using holographic interference techniques, soft lithography, and micro molding. At the cross-reflection and self-reflection Bragg wavelengths, the transmission dips of approximately −16.4 and −11.5 dB relative to the −3 dB background insertion loss and the 3 dB transmission bandwidths of approximately 0.6 and 0.5 nm were obtained from an ABC-based filter.

Another object of the present invention is to develop a process to fabricate dual-channel polymeric waveguide filters based on an asymmetric Bragg coupler (ABC) whose difference of effective refractive indices of two single waveguides is easily controlled to avoid the unwanted overlap of the transmission spectrum.

DETAILED DESCRIPTION OF THE PREFERRED EMBODIMENT

I. The Embodiments of the Present Invention

Referring to the FIGS. 1 to 6, the present invention discloses a method for fabricating optical filter based on polymer asymmetric bragg couplers.

i. Grating Fabrication of the Present Invention

Figure 1:
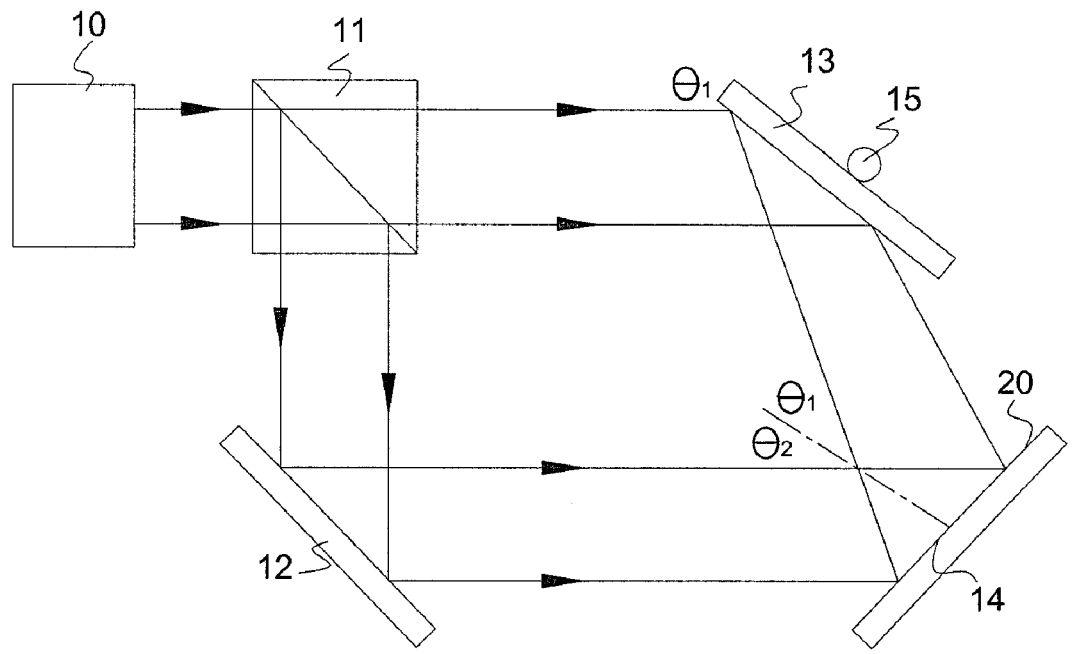
FIG. 1 is a holographic interferometric apparatus used by the present invention.
Figure 2:
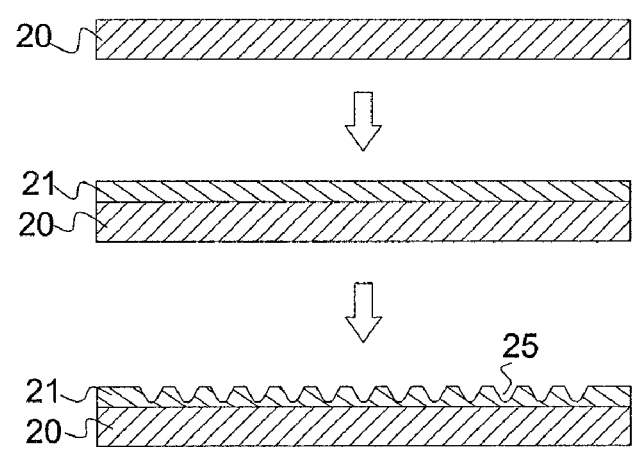
FIG. 2 shows a grating fabrication process in accordance with the present invention.
Figure 3A:
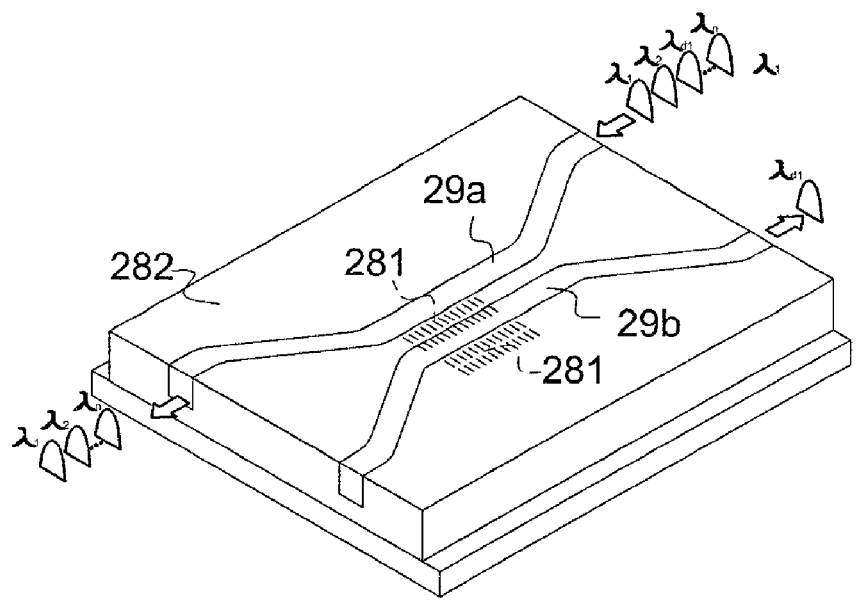
FIG. 3(a) is the schematic diagram of a polymeric asymmetric Bragg coupler (ABC) in accordance with the present invention.
Figure 3B:
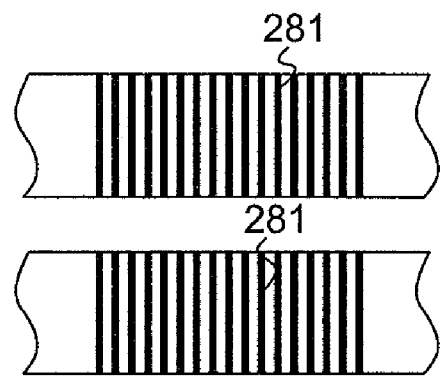
FIG. 3(b) is the Close-up view of the coupling/grating region directly from above in accordance with the present invention.
Figure 4:
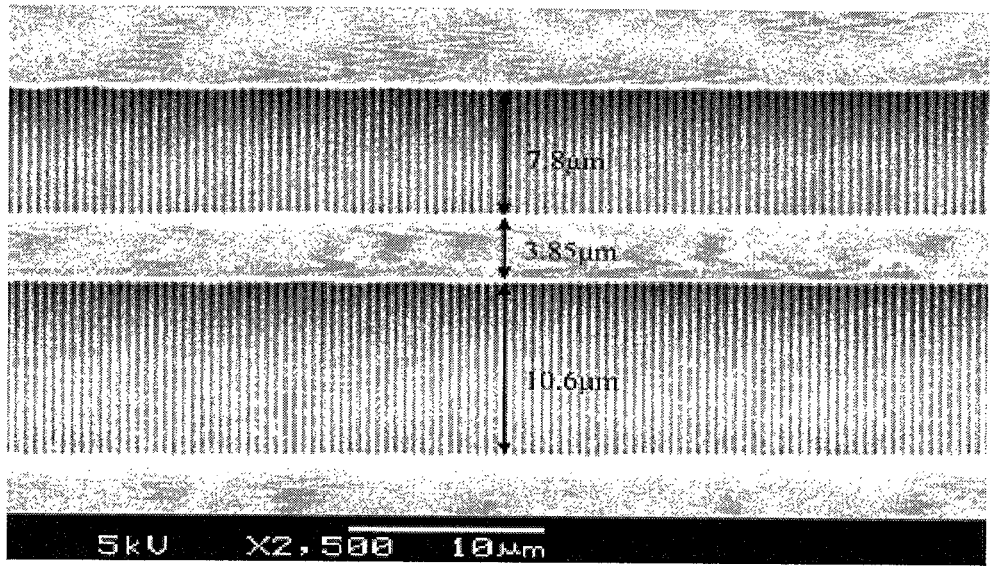
FIG. 4 is the SEM micrograph of the waveguide pattern on the photo-resist in accordance with the present invention tilted 4° degree showing an intact grating pattern inside the groove.
Figure 6:
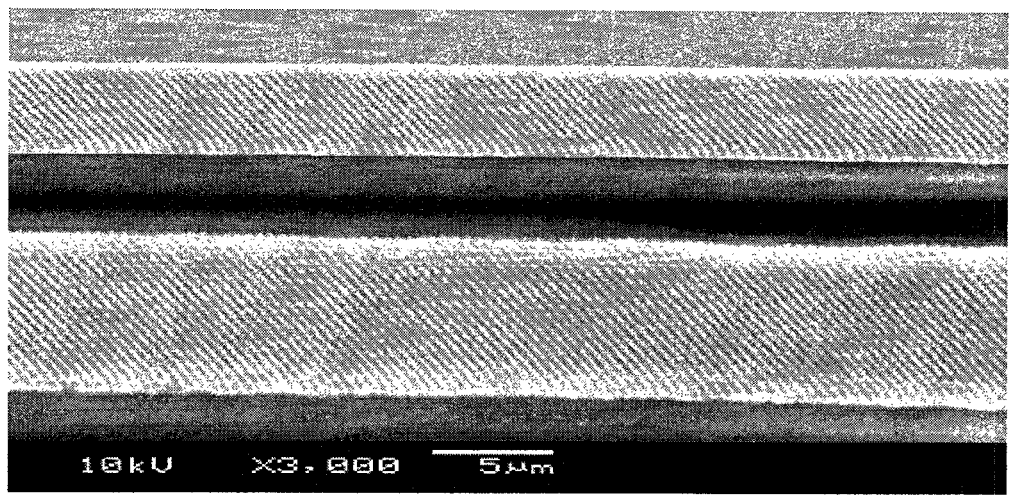
FIG. 6 is the SEM micrograph tilted 25° of the PDMS waveguide with gratings in accordance with the present invention.
Figure 5:
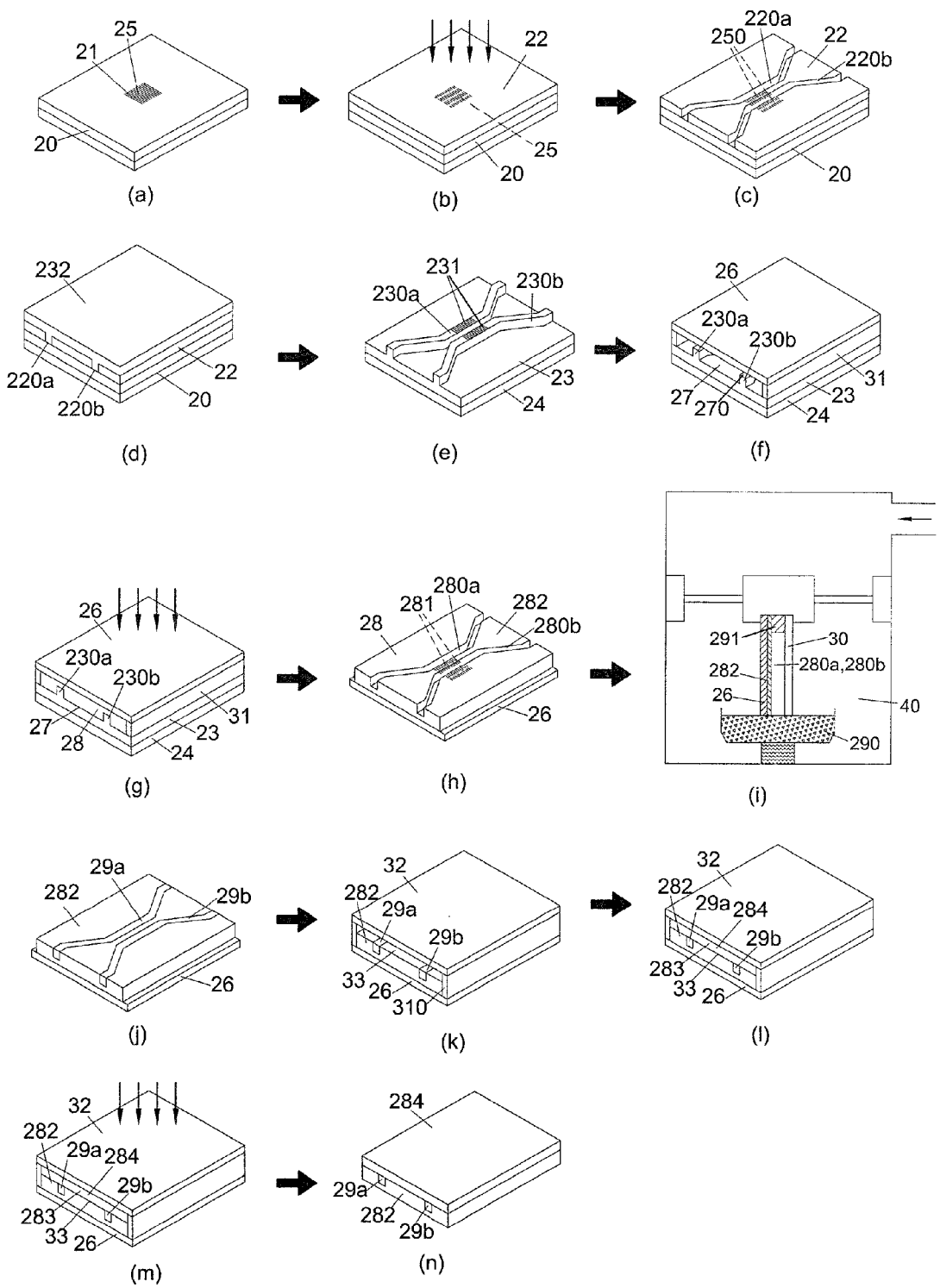
FIG. 5 shows the fabrication process in accordance with the present invention: (a) UV polymer with gratings is deposited on the glass; (b) the photo-resist is exposed to UV light; (c) the photo-resist mold is formed; (d) PDMS is poured into the photo-resist mold; (e) the PDMS mold is formed; (f) spacers is positioned; (g) precured OG146 epoxy is injected into the first tunnel; (h) hardened epoxy forms the cladding layer of the ABC filter; (i) mixed OG epoxy is injected into the grooves; (j) mixed OG epoxy is cured to be the waveguide cores in the grooves; (k) forms a second tunnel; (l) OG146 epoxy is injected into the second tunnel to form upper cladding layer; (m) exposed in UV light to crosslink the cladding layer and upper cladding layer; (n) The final polymeric ABC filter is obtained.
Figure 7A:
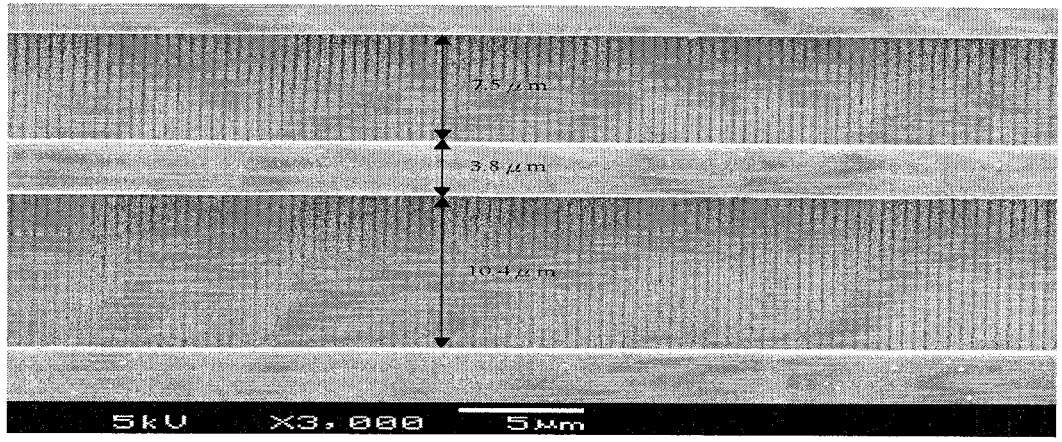
FIG. 7(a) is the SEM tilted 5° degree of the grooves of the cladding layer of sample 1 in accordance with the present invention showing the intact grating pattern inside the groove.
Figure 7B:
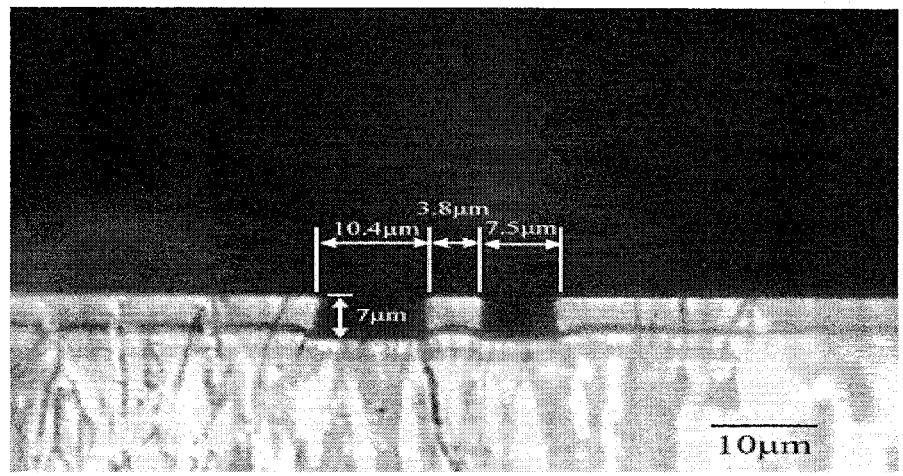
FIG. 7(b) is the Optical Micrograph of the grooves of the cladding layer of sample 1 in accordance with the present invention showing the intact grating pattern inside the groove.
Figure 7C:
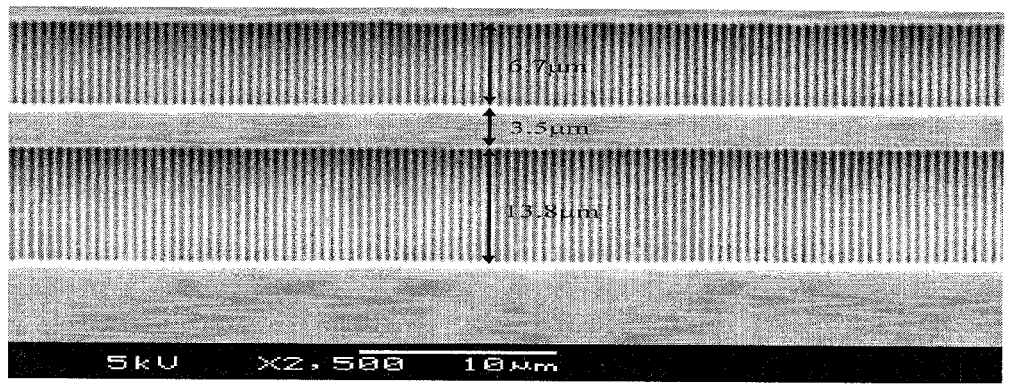
FIG. 7(c) is the SEM tilted 5° degree of the grooves of the cladding layer of sample 2 in accordance with the present invention showing the intact grating pattern inside the groove.
Figure 7D:
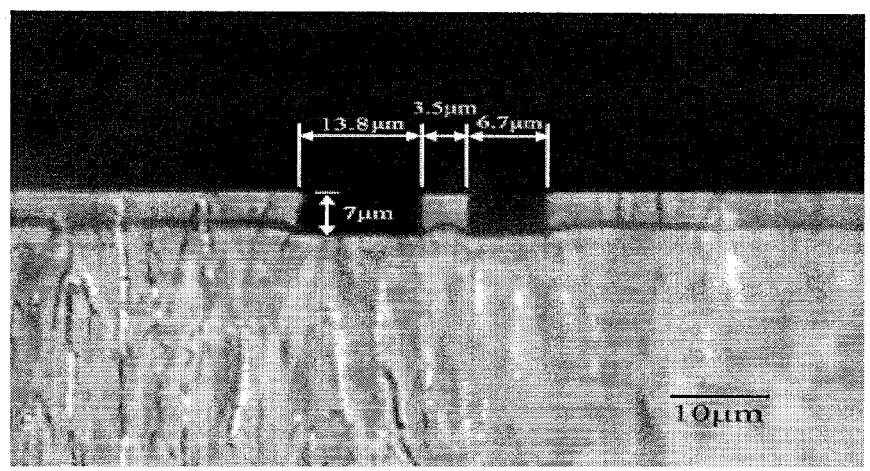
FIG. 7(d) is the Optical Micrograph of the grooves of the cladding layer of sample 2 in accordance with the present invention showing the intact grating pattern inside the groove.

The fabrication method of the present invention, rapid prototyping of grating structures on a UV polymer substrate (preferably OG146 epoxy), involves a three-step process performed firstly. Referring to FIGS. 1 and 2, a positive photo-resister film 21 is coated on the OG146 epoxy substrate 20 by using a spin coater, wherein, the spin condition is 3000 rpm for 20 seconds and the thickness of the photo-resister film 21 is about 0.45 µm. A gratings pattern 210 is holographically exposed on the positive photo-resister film 21 by using a holographic interferometric apparatus 10 to produce a two-beam interference pattern (wherein, the photo-resister used in the invention is Ultra 123 made by MicroChem Corp., MA., whose refractive index is 1.618). This produces a master of photo-resister film mold with the gratings that can be subsequently used to produce a polydimethylsiloxane (PDMS) mold with gratings which transferred from the master. This silicone rubber mold (i.e. polydimethylsiloxane mold) then is used as a stamp to transfer the gratings pattern onto an ultraviolet ("UV") cure epoxy polymer (UV polymer). The details of the process involved in grating fabrication are described in our previous reports (referring to W. C. Chuang, C. T. Ho and W. C. Wang, "Fabrication of a high resolution periodical structure using a replication process" Opt. Express 13, 6685-6692 (2005)). The OG146 epoxy substrate with grating was cut down to dimensions of 1 cm×5 cm rectangle, and the dimensions of the gratings on the polymer were 0.9 cm long and 1 mm wide. FIG. 4 is SEM micrograph of the waveguide pattern on the photo-resist film mold, which showed an intact grating pattern inside the groove, the SEM was tilted 4° degree, the dimensions are 7.8 μm×7 μm and 10.6 μm×7 μm, the length is 5 cm, the gap is about 3.85 μm, and the grating period is 510 nm.

ii. Fabrication of the Optical Filter

Referring to FIGS. 5(a) and (c), in the present invention, in order to fabricate the optical filter based on polymer asymmetric bragg couplers, after a 700 μm thick glass substrate 200 cleaning, the aforementioned OG146 epoxy substrate 20 with gratings (the grating period is of 510 nm and grating depth is of 350 nm) was placed on the glass substrate 200, and the substrate 20 was coated with a 7.0 μm thick negative photo-resister film 22 (SU-8) spun on at 1000 rpm spin for 17 seconds be a first sample. The negative photo-resister film 22 were exposed by UV light through the PET (Polyethylene Terephthalate)-based masks using a UV mask aligner (AB-Manufacturing, CA) for 90 seconds, followed by developing in a SU-8 developer (MicroChem) for 45 seconds to obtain two first grooves 220a, 220b on the photo-resister film 22 with gratings 221 on their bottom for being a waveguide mold.

The patterned waveguide mold (i.e. the photo-resister mold) was used as a mother mold to transfer the grating pattern onto a polydimethylsiloxane (PDMS) thin film using typical micro-molding technique (e.g. stamping). Referring to FIG. 5(c) to (e), diluted PDMS film 232 was uniformly coated on the patterned waveguide mold (i.e. the photo-resister mold) and filling into the two first grooves 220a, 220b. After baking at 90° C. for 1 hr, the PDMS film 232 was cured and could be easily peeled off from the waveguide mold (i.e. the photo-resister mold) to be a PDMS mold 23 with two waveguides 230a, 230b each having gratings pattern 231 perfectly (Referring to FIG. 6).

The waveguide with the gratings pattern was transferred onto a UV polymer (OG146 epoxy) from the PDMS mold by using the UV replication process. Referring to FIGS. 5(e) to 5(h), The PDMS mold 23 was placed on a second substrate 24, spacers 31 with a thickness of 400 μm placed on the edge of the PDMS mold 23, a first glass slide 26 was placed over the top of the PDMS mold 23 and supported by the spacers 31, a gap 270 was formed between the first glass slide 26 and the top of two waveguides 230 of the PDMS mold 23, a first tunnel 27 including the gap 270 was formed between the first glass slide 26 and the PDMS mold 23, and then a mount of precured OG146 epoxy 28 was injected into the first tunnel 27. Then the OG146 epoxy 28 was cured under a broadband UV light operating in a wavelength range of 300~400 nm through the first glass slide 26. After separating the OG146 epoxy 28 with the first glass slide 26 from the PDMS mold 23 when fully cured, we obtained the hardened OG146 epoxy 28 having two grooves 280a, 280b each with gratings pattern 281 at its bottom and being to form a cladding layer 282 of the optical filter. The SEM images show that the replication on the hardened OG146 epoxy are good (Referring to FIG. 7 (a) for sample 1, and FIG. 7 (c) for sample 2), and match the negative photo-resist mold dimension well. The optical microscope (OM) images show the end faces of the cross-section of the two ABC filters (Referring to FIG. 7 (b) for sample 1, and FIG. 7 (d) for sample 2). For Sample 1, the dimensions of two waveguide grooves are 7.5 μm×7 μm and 10.4 μm×7 μm respectively, the length is 5 cm, and the gap between the two waveguide grooves is approximately 3.8 μm, and the grating period is 510 nm. For Sample 2, the dimensions are 6.7 μm×7 μm and 13.8 μm×7 μm respectively, the length is 5 cm, and the gap between the two waveguide grooves is approximately 3.5 μm, and the grating period is 510 nm.

To form the two waveguide cores 29a, 29b, amount of mixed UV polymer (mixed OG epoxy) was injected into the grooves 280a, 280b of the cladding layer 282. Instead of the spin-coating technique, which could create a thick unguided layer outside the core region resulting in some coupling loss during the input of the optical fiber to the filter, another method was proposed (Referring to FIGS. 5(i) to (j)). A thin layer of a polydimethylsiloxane (PDMS) spun onto a second glass slide 30, the second glass slide 30 placed over the cladding layer 282 covering the top of the grooves 280a, 280b of the cladding layer 282, mixed UV polymer 290 (mainly contain OG154 epoxy) injected into the grooves 280a, 280b of the cladding layer 282 to be the waveguide cores 29a, 29b of the optical filter. In order to inject the high-viscosity OG154 epoxy into the grooves 280a, 280b, we diluted OG154 epoxy with another UV epoxy (OG169 epoxy) to be the mixed UV polymer 290 (mixing ratio of OG154 epoxy and OG169 epoxy is 1:1 according to Vol. %) to reduce the viscosity of OG154 epoxy. After the curing process, the refractive index of the mixed UV polymer 290 was approximately 1.555 at 1550 nm. Then, a drop of the mixed UV polymer 291 was injected into the grooves 280a, 280b from one of its open ends. After exposure to UV light, the drop of the mixed UV polymer 291 sealed one end of the grooves 280a, 280b. Next, the sample was inserted into the liquid mixed UV polymer 290 with the open-end face down. This process was carried out in a vacuum chamber 40 (Referring to FIG. 5(i)). When the pressure in the chamber 40 reached $10^{-3}$ torr, air was introduced into the chamber to force the liquid mixed UV polymer 290 into the grooves 280a, 280b. The mixed UV polymer 290 in the grooves 280a, 280b was cured by exposure to UV light for 1-2 min. After the second glass slide 30 was removed, the PDMS layer was peeled off from the cladding layer 282, then we obtained the waveguide cores 29a, 29b in the grooves 280a, 280b of the cladding layer 282.

To prevent optical loss due to either surface scattering losses or the outright absence of a guided mode for the asymmetric waveguide structure, an upper cladding layer was used. The same UV polymer with the cladding layer (OG146 epoxy) was deposited to form the upper cladding layer. Referring to FIGS. 5(k)-(n), spacers 310 with a thickness of 410 μm was placed on the edge of the first glass slide 26, a third glass slide 32 was placed over the cladding layer 282 and supported by the spacers 310, a second tunnel 33 was formed between the third glass slide 32 and the top of the cladding layer 282. Precured OG146 epoxy 283 was injected into the second tunnel 33 to form an upper cladding layer 284 in the second tunnel 33, then exposed UV light to crosslink the cladding layer 282 and the upper cladding layer 284. Finally we moved away the first and third glass slides 26, 32, the process of the fabrication of the optical filter based on polymer asymmetric bragg couplers finished. The sample was diced and the end-faces were polished; the final polymeric ABC filter was 4 cm in length, 1 cm in width and approximately 810 μm in thickness.

iii. The Structure of the Polymer Wavelength Filter of the Present Invention

Refer to FIGS. 5(m) and 5(n), the present invention discloses an optical filter based on polymer asymmetric bragg couplers comprises:

a cladding layer 282 having two groove 280a, 280b each with gratings 281 at its bottom, the cladding layer 282 made by amount of OG146 epoxy;

two waveguide cores 29a, 29b respectively formed in the two grooves 280a, 280b of the cladding layer 282 by amount of mixed UV polymer 290, the effective refractive indices of the two waveguide cores 29a, 29b are different, and the mixed UV polymer 290 being OG154 epoxy diluted with OG169 epoxy; and an upper cladding layer 284 for covering the cladding layer 282 and the two waveguide cores 29a, 29b, and the upper cladding layer 284 made by amount of OG146 epoxy.

In one embodiment of the present invention, the optical filter has dimensions of 4 cm in length, 1 cm in width and about 810 μm in thickness, the mixing ratio of OG154 epoxy and OG169 epoxy of the mixed UV polymer is 1:1 according to vol. %.

In our experiment, we fabricated two samples: Sample 1, the dimensions of two waveguide grooves are 7.5 μm×7 μm in width×depth and 10.4 μm×7 μm in width×depth respectively, the length is 5 cm, and the gap between the two waveguide grooves is approximately 3.8 μm, the grating period is 510 nm, the mixing ratio of OG154 epoxy is from 45~60 according to vol. %, and the refractive index of the two waveguide cores is from 1.549 to 1.560 at the cross-reflection Bragg wavelength from 1575.5578 to 1586.5498 nm. For Sample 2, the dimensions of two waveguide grooves are 6.7 μm×7 μm in width×dept and 13.8 μm×7 μm in width×dept respectively, the length is 5 cm, and the gap between the two waveguide grooves is approximately 3.5 μm, and the grating period is 510 nm. The two waveguides made by mixed polymer with different mixing ratio of OG154 epoxy, so that they are asynchronous because their effective refractive indices are different, and an efficient power coupling can be achieved.

II. The Waveguide Properties of the Present Invention

Figure 8A:
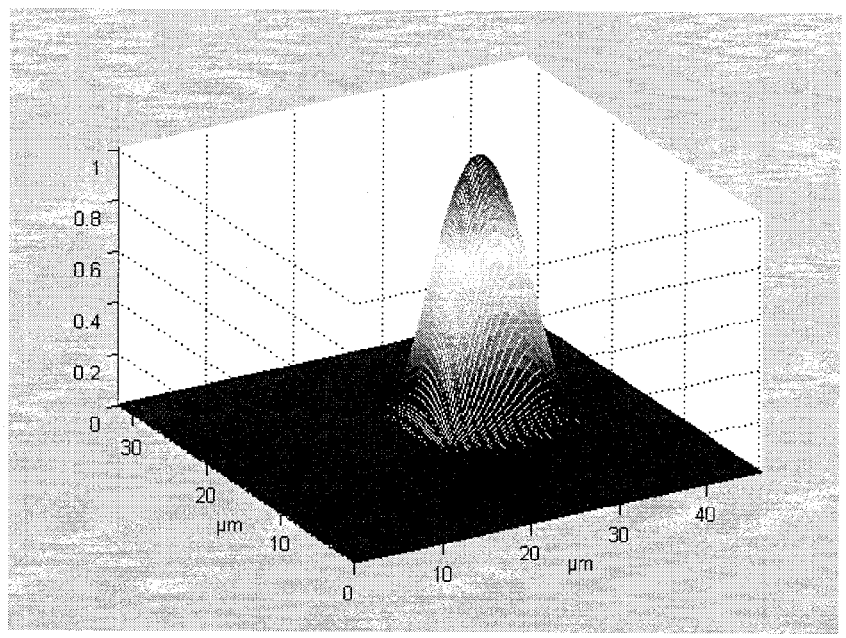
FIG. 8(a) is the Fundamental mode of the single waveguide in accordance with the present invention with width w=13.8 µm.
Figure 8B:
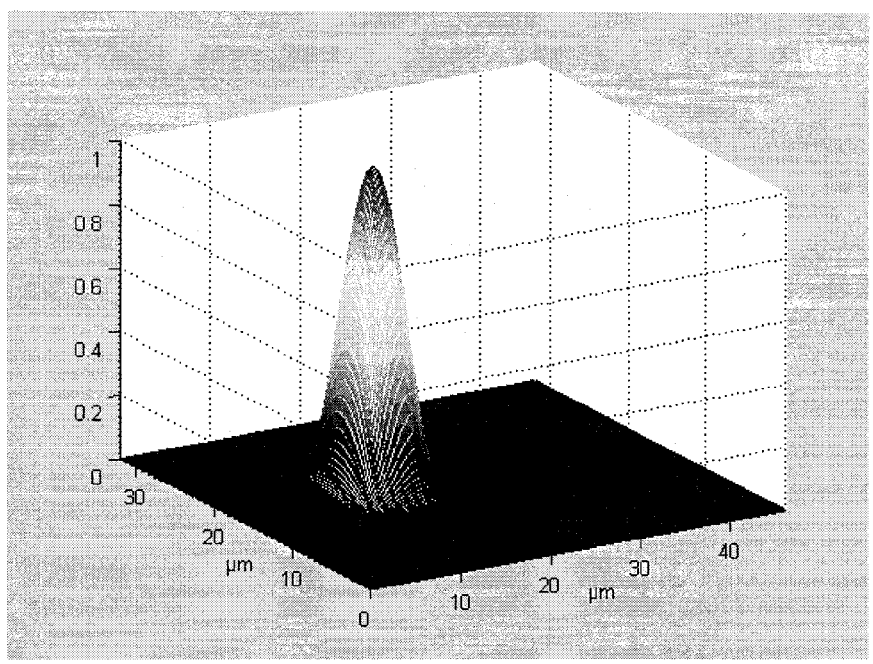
FIG. 8(b) is the Fundamental mode of the single waveguide in accordance with the present invention with width w=6.7 µm.
Figure 8C:
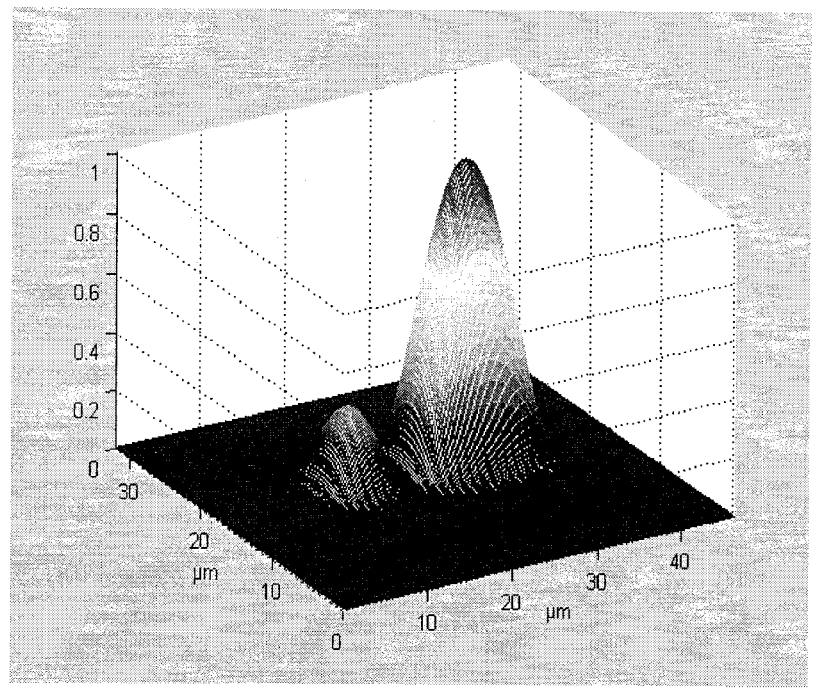
FIG. 8(c) is the first compound mode of the coupler structure in accordance with the present invention.
Figure 8D:
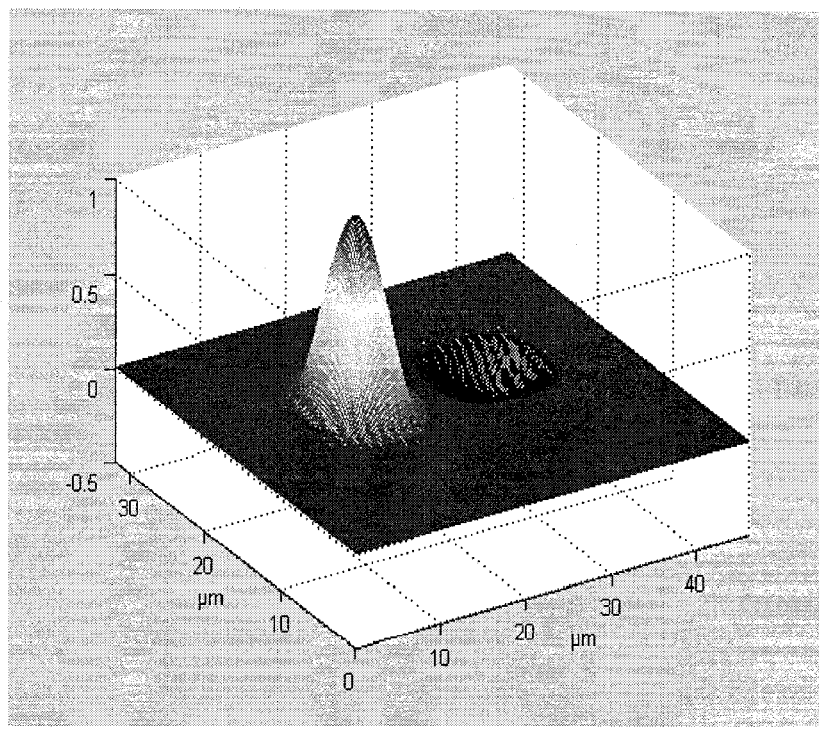
FIG. 8(d) is the second compound mode of the coupler structure in accordance with the present invention.

The waveguide properties, including the mode pattern and the effective index, were simulated using the beam propagation method (BPM_CAD, Opti-Wave Inc., Canada). In order to prevent co-directional evanescent coupling to obtain excellent crosstalk performance, we used highly asymmetric waveguides for the coupler to have compound modes confined to each single waveguide. In the present invention, the compound modes provided good approximations for the modes of single waveguides. FIGS. 8(a) and 8(b) show the fundamental modes of the single waveguides, and FIGS. 8(c) and 8(d) show the compound modes of the ABC coupler in Sample 2.

The effective indices of the compound modes for Sample 2 are $n_{eff1}$=1.55149 and $n_{eff2}$=1.54964 (Table 1), corresponding to the single waveguide modes $n_{eff1\_s}$=1.55155 and $n_{eff2\_s}$=1.54958, respectively. The overlap integrals between the single and the compound modes are 98.25% and 97.95% for the first and second modes, respectively. The simulation result shows the waveguides in the sample are highly asymmetry. The effective indices for the single waveguides of Sample 1 are 1.55101 and 1.55005, as obtained from the simulation (Table 1).

TABLE 1

The simulation and measurement results of sample 1 and sample 2

| | The simulation results | | | | The measurement results | | | |
|---|---|---|---|---|---|---|---|---|
| | The effective index | | Bragg wavelength(μm) | | Bragg wavelength(μm) | | The transmission dips at Bragg wavelength(Db) | |
| | $n_{eff1}$ | $n_{eff1}$ | Cross-reflection | Self-reflection | Cross-reflection | Self-reflection | Cross-reflection | Self-reflection |
| Sample1 | 1.55101 | 1.55005 | 1581.5406 | 1581.041 | 1581.6 | 1581 | −12.1 | −16.3 |
| Sample2 | 1.55155 | 1.54958 | 1581.5763 | 1580.5716 | 1581.3 | 1581.03 | −11.5 | −16.4 |

Figure 10:
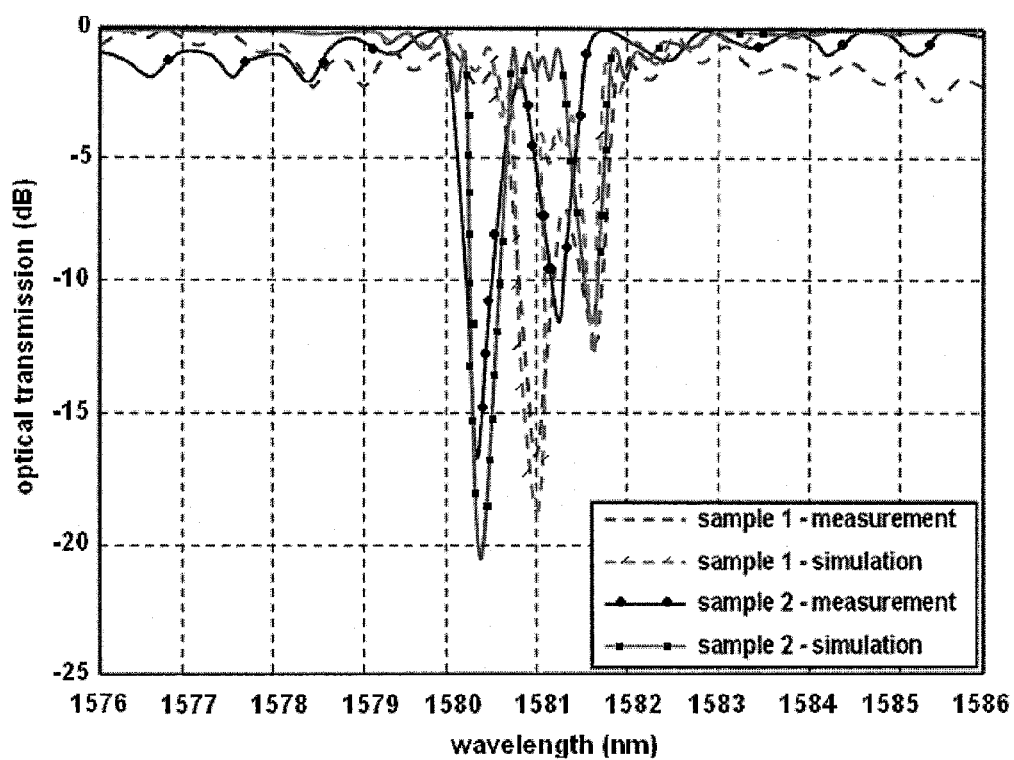
FIG. 10 shows the transmission spectra of the ABC filter in accordance with the present invention with a 0.9 cm-long grating length.

The cross-reflection Bragg wavelengths $\lambda_{d1}$ are 1581.5406 and 1581.5763 nm and the self-reflection Bragg wavelengths $\lambda_{d2}$ ($\lambda_{d2}$=2 $n_{eff2}$ Λ) are 1581.041 and 1580.5716 nm (Table 1), as calculated from the Bragg reflection conditions for the Sample 1 and 2 filters, respectively, with a grating period of 510 nm. When the core refractive index ranges from 1.549 to 1.560 for a mixing ratio of OG154 of 45-60 vol. %, the calculated cross-reflection Bragg wavelength through the beam propagation method varies from 1575.5578 to 1586.5498 nm for Sample 1 and from 1575.5945 to 1586.5822 nm for Sample 2. Using the simulation, the transmission of the optical filter can be calculated using the coupled mode theory (Reference: A. Yariv, *Introduction to Optical Electronics*, $3^{rd}$ edition, (H. Rinehart & Winston, New York, 1984)), and the calculated results were shown in FIG. 10 and Table 1.

Figure 9:
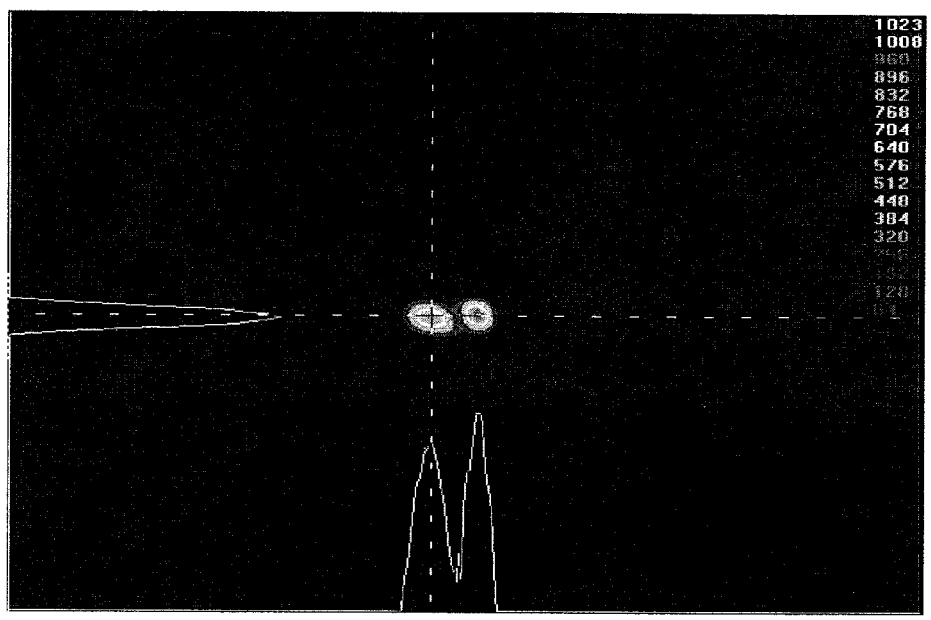
FIG. 9 shows the Near-field pattern for the ABC filter of Sample 2 in accordance with the present invention.

The near-field patterns of the optical waveguide were observed using the end-fire coupling technique. An amplified spontaneous emission (ASE) source with a wavelength range of 1530-1560 nm was used as the wideband light source (Stabilized Light Source, PTS-BBS, Newport Inc., USA). The light source was polarized in the TE direction using the in-line polarizer (ILP-55-N, Advanced Fiber Resources, China), which was followed by a polarization controller with an operation wavelength of around 1550 nm (F-POL-PC, Newport Inc., USA). The polarization state is examined by using near infrared precision linear polarizer (20LP-NIR, New Port Inc., USA). The output mode field of the waveguide was observed using an IR-CCD system (Model 7290A, Micron Viewer, Electrophysics Inc., U.S.A.) with image analysis software (LBA-710PC-D, V4.17, Spiricon Inc., USA) to show the single-mode characteristics of the waveguide. FIG. 9 shows the field intensity distribution of the two-waveguide-coupled region for Sample 2; the ASE laser light was shone onto the narrow waveguide end; the high asymmetric mode profile can be observed as well.

The spectral characteristics of the ABC-based filter were measured using a tunable laser system (Q8384 Optical Spectrum Analyzer, Advantest Inc., Japan). The output fiber of the tunable laser is of Panda-type polarization maintaining fiber, with TE mode in the slow axis in line with vertical direction. Again, a tunable laser light source with a wavelength range of 1511-1620 nm was used as the wideband light source and followed by a polarization controller. An alignment He—Ne laser source, used as the auxiliary source, was combined with the wideband source using a 2×1 optical fiber coupler. The optical filter was set on a micro-positioner, and two single mode fibers were used as the input and output fibers. The input light source was polarized in the TE direction, as was the mode field measurement system. The output fiber was then connected to the receiver end of the tunable laser to characterize the filter performance. The tunable laser was coupled onto the narrow waveguide ends of the filters and coupled out from the alternative end of the same waveguides. The measured results which are similar to the theoretical results depicted in FIG. 10. Apart from for the upper transmission dips, which resulted from the cross-reflection Bragg condition ($\lambda_{d1}$), a lower transmission dip resulting from the self-reflection Bragg condition ($\lambda_{d2}$) was observed as well.

At the cross-reflection Bragg wavelength, a transmission dips of −12.1 and −11.5 dB were obtained for Samples 1 and 2, respectively (Table 1). At the self-reflection Bragg wavelength, the dips were −16.3 and −16.4 dB for Samples 1 and 2 (Table 1), respectively. The measured cross-reflection Bragg wavelengths were 1581.6 and 1581.3 nm, which are off approximately 0.06 and 0.28 nm from the theoretical predictions for Samples 1 and 2, respectively. The measured self-reflection Bragg wavelengths were 1581.0 and 1580.3 nm, which are off approximately 0.04 and 0.27 nm from the theoretical predictions for Samples 1 and 2, respectively. The 3 dB transmission bandwidth of Sample 2 is approximately 0.5 and 0.6 nm for the cross-reflection and self-reflection modes, respectively. Nevertheless, for Sample 1, the transmission spectra for cross- and self-reflection overlap due to small differences between the effective indices of the two single waveguides. Different samples with the difference of the effective index between two waveguides have been used, and the transmission spectra of cross- and self-reflection would overlap when the difference is below 0.002. The results of Sample 2 show that the effective index difference should be greater than 0.002 to prevent spectrum overlapping.

III. Conclusion

In conclusion, we have successfully created a process to fabricate dual-channel polymeric waveguide filters based on an asymmetric Bragg coupler. In the present invention, the grating structure on a polymer is fabricated first using holographic interferometry and micro-molding processes. The ABC filters are produced by a two-step molding process where the master mold is first formed on a negative tone photo-resist and subsequently transferred to a PDMS mold; following this step, the PDMS silicon rubber mold was used as a stamp to transfer the pattern of the ABC filters onto a UV cure epoxy. For an ABC filter with dimensions of 6.7 µm×7 µm and 13.8 µm×7 µm, length of 5 cm, gap of 3.5 µm, grating length of 0.9 cm, grating period of 510 nm, and grating depth of 350 nm, the transmission dips are approximately −16.4 and −11.5 dB, and the 3 dB transmission bandwidths are approximately 0.6 and 0.5 nm. The transmission spectrum overlaps when the effective index difference between two single waveguides is less than 0.002. This process shows great potential for mass production of optical filter based on polymer asymmetric bragg couplers.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method for fabricating optical filter based on polymer asymmetric bragg couplers comprising following steps:
 (a) coating a positive photo-resist film on a UV polymer substrate, holographically exposing a gratings pattern on the positive photo-resister film by two-beam interference pattern produced by a holographic interferometric apparatus to form gratings on the UV polymer substrate;
 (b) coating a negative photo-resister film on the UV polymer substrate with the gratings;
 (c) exposing the photo-resister film by UV light through a mask, then developing in a developer for 45 seconds to obtain two first grooves on the photo-resister film, and each first groove showing the gratings on its bottom to be a waveguide mold;
 (d) coating a PDMS film on the waveguide mold and filling into the two first grooves;
 (e) baking the PDMS film at about 90 degree C. for 1 hour to be cured, and peeling off the PDMS film from the waveguide mold to be a PDMS mold with two waveguides each having gratings pattern;
 (f) placing the PDMS mold on a second substrate, placing spacers on the edge of the PDMS mold, placing a first glass slide over the PDMS mold and being supported by the spacers, a gap being formed between the first glass slide and the top of two waveguides of the PDMS mold, a first tunnel including the gap formed between the first glass slide and the PDMS mold, and injecting amount of precured OG146 epoxy into the first tunnel, wherein the gap between the two grooves being 3.8 µm, the width and depth of one groove being 10.4 µm and 7 µm, the width and depth of the other groove being 7.5 µm and 7 µm, the period of the gratings being 510 nm, the mixing ratio of OG154 epoxy being from 45~60 according to vol. %, the refractive index of the two waveguide cores being from 1.549 to 1.560 at the cross-reflection Bragg wavelength from 1575.5578 to 1586.5498 nm;
 (g) curing the OG146 epoxy under a broadband UV light operating in a wavelength range of 300~400 nm through the first glass slide;
 (h) separating the OG146 epoxy with the first glass slide from the PDMS mold when fully cured, the hardened OG146 epoxy having two grooves each with gratings pattern at its bottom and being to form a cladding layer of the optical filter;
 (i) a thin layer of a polydimethylsiloxane (PDMS) being spun onto a second glass slide, placing the second glass slide over the cladding layer covering the top of the grooves of the cladding layer, injecting specific amount of mixed UV polymer into the grooves of the cladding layer to be the waveguide cores of the optical filter, and the mixed UV polymer being OG154 epoxy diluted with OG169 epoxy;
 (j) curing the mixed UV polymer by exposing the UV light to form the waveguide cores in the grooves of the cladding layer, and moving away the second glass slide;
 (k) placing spacers on the edge of the first glass slide, placing a third glass slide over the cladding layer and being supported by the spacers, a second tunnel being formed between the third glass slide and the top of the cladding layer;
 (l) injecting specific amount of precured OG146 epoxy into the second tunnel to form an upper cladding layer in the second tunnel;

(m) exposing UV light to crosslink the cladding layer and the upper cladding layer; and (n) moving away the first and third glass slides, and finishing the process of the fabrication of the optical filter based on polymer asymmetric bragg couplers.

2. A method for fabricating optical filter based on polymer asymmetric bragg couplers comprising following steps:

(a) coating a positive photo-resist film on a UV polymer substrate, holographically exposing a gratings pattern on the positive photo-resister film by two-beam interference pattern produced by a holographic interferometric apparatus to form gratings on the UV polymer substrate;

(b) coating a negative photo-resister film on the UV polymer substrate with the gratings;

(c) exposing the photo-resister film by UV light through a mask, then developing in a developer for 45 seconds to obtain two first grooves on the photo-resister film, and each first groove showing the gratings on its bottom to be a waveguide mold;

(d) coating a PDMS film on the waveguide mold and filling into the two first grooves;

(e) baking the PDMS film at about 90 degree C. for 1 hour to be cured, and peeling off the PDMS film from the waveguide mold to be a PDMS mold with two waveguides each having gratings pattern;

(f) placing the PDMS mold on a second substrate, placing spacers on the edge of the PDMS mold, placing a first glass slide over the PDMS mold and being supported by the spacers, a gap being formed between the first glass slide and the top of two waveguides of the PDMS mold, a first tunnel including the gap formed between the first glass slide and the PDMS mold, and injecting amount of precured OG146 epoxy into the first tunnel, wherein the gap between the two grooves being 3.5 µm, the width and depth of one groove being 13.8 µm and 7 µm, the width and depth of the other groove being 6.7 µm and 7 µm, the period of the gratings being 510 nm, the mixing ratio of OG154 epoxy being from 45~60 according to vol. %, the refractive index of the two waveguide cores being from 1.549 to 1.560 at the cross-reflection Bragg wavelength from 1575.5945 to 1586.5822 nm;

(g) curing the OG146 epoxy under a broadband UV light operating in a wavelength range of 300~400 nm through the first glass slide;

(h) separating the OG146 epoxy with the first glass slide from the PDMS mold when fully cured, the hardened OG146 epoxy having two grooves each with gratings pattern at its bottom and being to form a cladding layer of the optical filter;

(i) a thin layer of a polydimethylsiloxane (PDMS) being spun onto a second glass slide, placing the second glass slide over the cladding layer covering the top of the grooves of the cladding layer, injecting specific amount of mixed UV polymer into the grooves of the cladding layer to be the waveguide cores of the optical filter, and the mixed UV polymer being OG154 epoxy diluted with OG169 epoxy;

(j) curing the mixed UV polymer by exposing the UV light to form the waveguide cores in the grooves of the cladding layer, and moving away the second glass slide;

(k) placing spacers on the edge of the first glass slide, placing a third glass slide over the cladding layer and being supported by the spacers, a second tunnel being formed between the third glass slide and the top of the cladding layer;

(l) injecting specific amount of precured OG146 epoxy into the second tunnel to form an upper cladding layer in the second tunnel;

(m) exposing UV light to crosslink the cladding layer and the upper cladding layer; and (n) moving away the first and third glass slides, and finishing the process of the fabrication of the optical filter based on polymer asymmetric bragg couplers.

3. A method for fabricating optical filter based on polymer asymmetric bragg couplers comprising following steps:

(a) coating a positive photo-resist film on a UV polymer substrate, holographically exposing a gratings pattern on the positive photo-resister film by two-beam interference pattern produced by a holographic interferometric apparatus to form gratings on the UV polymer substrate;

(b) coating a negative photo-resister film on the UV polymer substrate with the gratings;

(c) exposing the photo-resister film by UV light through a mask, then developing in a developer for 45 seconds to obtain two first grooves on the photo-resister film, and each first groove showing the gratings on its bottom to be a waveguide mold;

(d) coating a PDMS film on the waveguide mold and filling into the two first grooves;

(e) baking the PDMS film at about 90 degree C. for 1 hour to be cured, and peeling off the PDMS film from the waveguide mold to be a PDMS mold with two waveguides each having gratings pattern;

(f) placing the PDMS mold on a second substrate, placing spacers on the edge of the PDMS mold, placing a first glass slide over the PDMS mold and being supported by the spacers, a gap being formed between the first glass slide and the top of two waveguides of the PDMS mold, a first tunnel including the gap formed between the first glass slide and the PDMS mold, and injecting amount of precured OG146 epoxy into the first tunnel, wherein the gap between the two grooves being 3.8 µm, the width and depth of one groove being 10.4 µm and 7 µm, the width and depth of the other groove being 7.5 µm and 7 µm, the period of the gratings being 510 nm, the mixing ratio of OG154 epoxy of the mixed UV polymer of the first waveguide core being 45 according to vol. %, the refractive index of the first waveguide core being 1.549 at the cross-reflection Bragg wavelength 1575.5578 nm, the mixing ratio of OG154 epoxy of the mixed UV polymer of the second waveguide core being 60 according to vol. %, the refractive index of the second waveguide core being 1.560 at the cross-reflection Bragg wavelength 1586.5498 nm;

(g) curing the OG146 epoxy under a broadband UV light operating in a wavelength range of 300~400 nm through the first glass slide;

(h) separating the OG146 epoxy with the first glass slide from the PDMS mold when fully cured, the hardened OG146 epoxy having two grooves each with gratings pattern at its bottom and being to form a cladding layer of the optical filter;

(i) a thin layer of a polydimethylsiloxane (PDMS) being spun onto a second glass slide, placing the second glass slide over the cladding layer covering the top of the grooves of the cladding layer, injecting specific amount of mixed UV polymer into the grooves of the cladding layer to be the waveguide cores of the optical filter, and the mixed UV polymer being OG154 epoxy diluted with OG169 epoxy;

(j) curing the mixed UV polymer by exposing the UV light to form the waveguide cores in the grooves of the cladding layer, and moving away the second glass slide;

(k) placing spacers on the edge of the first glass slide, placing a third glass slide over the cladding layer and being supported by the spacers, a second tunnel being formed between the third glass slide and the top of the cladding layer;

(l) injecting specific amount of precured OG146 epoxy into the second tunnel to form an upper cladding layer in the second tunnel;

(m) exposing UV light to crosslink the cladding layer and the upper cladding layer; and (n) moving away the first and third glass slides, and finishing the process of the fabrication of the optical filter based on polymer asymmetric bragg couplers.

4. A method for fabricating optical filter based on polymer asymmetric bragg couplers comprising following steps:

(a) coating a positive photo-resist film on a UV polymer substrate, holographically exposing a gratings pattern on the positive photo-resister film by two-beam interference pattern produced by a holographic interferometric apparatus to form gratings on the UV polymer substrate;

(b) coating a negative photo-resister film on the UV polymer substrate with the gratings;

(c) exposing the photo-resister film by UV light through a mask, then developing in a developer for 45 seconds to obtain two first grooves on the photo-resister film, and each first groove showing the gratings on its bottom to be a waveguide mold;

(d) coating a PDMS film on the waveguide mold and filling into the two first grooves;

(e) baking the PDMS film at about 90 degree C. for 1 hour to be cured, and peeling off the PDMS film from the waveguide mold to be a PDMS mold with two waveguides each having gratings pattern;

(f) placing the PDMS mold on a second substrate, placing spacers on the edge of the PDMS mold, placing a first glass slide over the PDMS mold and being supported by the spacers, a gap being formed between the first glass slide and the top of two waveguides of the PDMS mold, a first tunnel including the gap formed between the first glass slide and the PDMS mold, and injecting amount of precured OG146 epoxy into the first tunnel, wherein the gap between the two grooves being 3.5 µm, the width and depth of one groove being 13.8 µm and 7 µm, the width and depth of the other groove being 6.7 vm and 7 vm, the period of the gratings being 510 nm, the mixing ratio of OG154 epoxy of the mixed UV polymer of the first waveguide core being 45 according to vol. %, the refractive index of the first waveguide core being 1.549 at the cross-reflection Bragg wavelength 1575.5945 nm, the mixing ratio of OG154 epoxy of the mixed UV polymer of the second waveguide core being 60 according to vol. %, the refractive index of the second waveguide core being 1.560 at the cross-reflection Bragg wavelength 1586.5822 nm;

(g) curing the OG146 epoxy under a broadband UV light operating in a wavelength range of 300~400 nm through the first glass slide;

(h) separating the OG146 epoxy with the first glass slide from the PDMS mold when fully cured, the hardened OG146 epoxy having two grooves each with gratings pattern at its bottom and being to form a cladding layer of the optical filter;

(i) a thin layer of a polydimethylsiloxane (PDMS) being spun onto a second glass slide, placing the second glass slide over the cladding layer covering the top of the grooves of the cladding layer, injecting specific amount of mixed UV polymer into the grooves of the cladding layer to be the waveguide cores of the optical filter, and the mixed UV polymer being OG154 epoxy diluted with OG169 epoxy;

(j) curing the mixed UV polymer by exposing the UV light to form the waveguide cores in the grooves of the cladding layer, and moving away the second glass slide;

(k) placing spacers on the edge of the first glass slide, placing a third glass slide over the cladding layer and being supported by the spacers, a second tunnel being formed between the third glass slide and the top of the cladding layer;

(l) injecting specific amount of precured OG146 epoxy into the second tunnel to form an upper cladding layer in the second tunnel;

(m) exposing UV light to crosslink the cladding layer and the upper cladding layer; and (n) moving away the first and third glass slides, and finishing the process of the fabrication of the optical filter based on polymer asymmetric bragg couplers.

* * * * *